(12) United States Patent
Song

(10) Patent No.: US 10,263,760 B2
(45) Date of Patent: Apr. 16, 2019

(54) METHOD FOR TIME SYNCHRONIZATION

(71) Applicant: LSIS CO., LTD., Anyang-si, Gyeonggi-do (KR)

(72) Inventor: Dong Shin Song, Incheon (KR)

(73) Assignee: LSIS CO., LTD., Anyang-si, Gyeonggi-Do (KR)

(*) Notice: Subject to any disclaimer, the term of this patent is extended or adjusted under 35 U.S.C. 154(b) by 174 days.

(21) Appl. No.: 15/095,551

(22) Filed: Apr. 11, 2016

(65) Prior Publication Data

US 2016/0308663 A1  Oct. 20, 2016

(30) Foreign Application Priority Data

Apr. 14, 2015 (KR) .................. 10-2015-0052757

(51) Int. Cl.
G06F 15/16 (2006.01)
H04L 7/00 (2006.01)
H04J 3/06 (2006.01)

(52) U.S. Cl.
CPC .......... *H04L 7/0016* (2013.01); *H04J 3/0664* (2013.01); *H04J 3/0697* (2013.01)

(58) Field of Classification Search
CPC ... H04L 7/0016; H04L 5/0048; H04L 7/0037; H04J 3/0664
USPC ........................................................ 709/248
See application file for complete search history.

(56) References Cited

U.S. PATENT DOCUMENTS

| | | | |
|---|---|---|---|
| 5,566,180 A | 10/1996 | Eidson et al. | |
| 7,184,501 B1* | 2/2007 | Fukuda | H04L 1/0084 340/12.15 |
| 2003/0117899 A1 | 6/2003 | Eidson | |
| 2010/0260165 A1* | 10/2010 | Amagai | G06F 1/12 370/345 |
| 2010/0293308 A1* | 11/2010 | Chou | G06F 13/4286 710/52 |
| 2012/0051374 A1 | 3/2012 | Obradovic et al. | |
| 2012/0300859 A1 | 11/2012 | Chapman et al. | |

(Continued)

FOREIGN PATENT DOCUMENTS

| | | |
|---|---|---|
| CN | 1835597 A | 9/2006 |
| CN | 1965283 A | 5/2007 |
| CN | 101834712 A | 9/2010 |

(Continued)

OTHER PUBLICATIONS

David L. Mills, Improved Algorithms for Synchronizing Computer Network Clocks, IEEE/ACM Transactions Networking, vol. 3 No. 3, Jun. 1995, pp. 245-254.

(Continued)

*Primary Examiner* — Oscar A Louie
*Assistant Examiner* — Oluwatosin M Gidado
(74) *Attorney, Agent, or Firm* — K&L Gates LLP

(57) ABSTRACT

Embodiments relate to a method for time synchronization and, more particularly, to a method for time synchronization between devices and the devices using the same. The method for time synchronization includes: receiving data from a first device; checking time information of the first device, which is included in the received data; and correcting a time error based on the checked time information, wherein the time error is corrected using a correction constant according to a time error relative to the first device.

8 Claims, 5 Drawing Sheets

(56) References Cited

U.S. PATENT DOCUMENTS

2013/0282875 A1   10/2013   Aweya et al.

FOREIGN PATENT DOCUMENTS

| CN | 102412954 | A | 4/2012 |
|----|-----------|---|--------|
| CN | 102870477 | A | 1/2013 |
| DE | 4215380 |  | 11/1993 |
| JP | 2014096853 | A | 5/2015 |
| KR | 20090059471 |  | 6/2009 |
| WO | 2013129672 | A1 | 6/2013 |

OTHER PUBLICATIONS

European Patent Application No. 16164153.5, Search Report dated Sep. 14, 2016, 18 pages.
Korean Intellectual Property Office Application Serial No. 10-2015-0052757, Office Action dated Feb. 1, 2016, 5 pages.
Chinese Office Action for related Chinese Application No. 201610225397.3; dated Oct. 10, 2017; (5 pages).
Japanese Office Action for related Japanese Application No. 2016-080293; dated Nov. 21, 2017; (2 pages).
Chinese Office Action for related Chinese Application No. 201610225397.3; action dated Jan. 17, 2019; (7 pages).

* cited by examiner

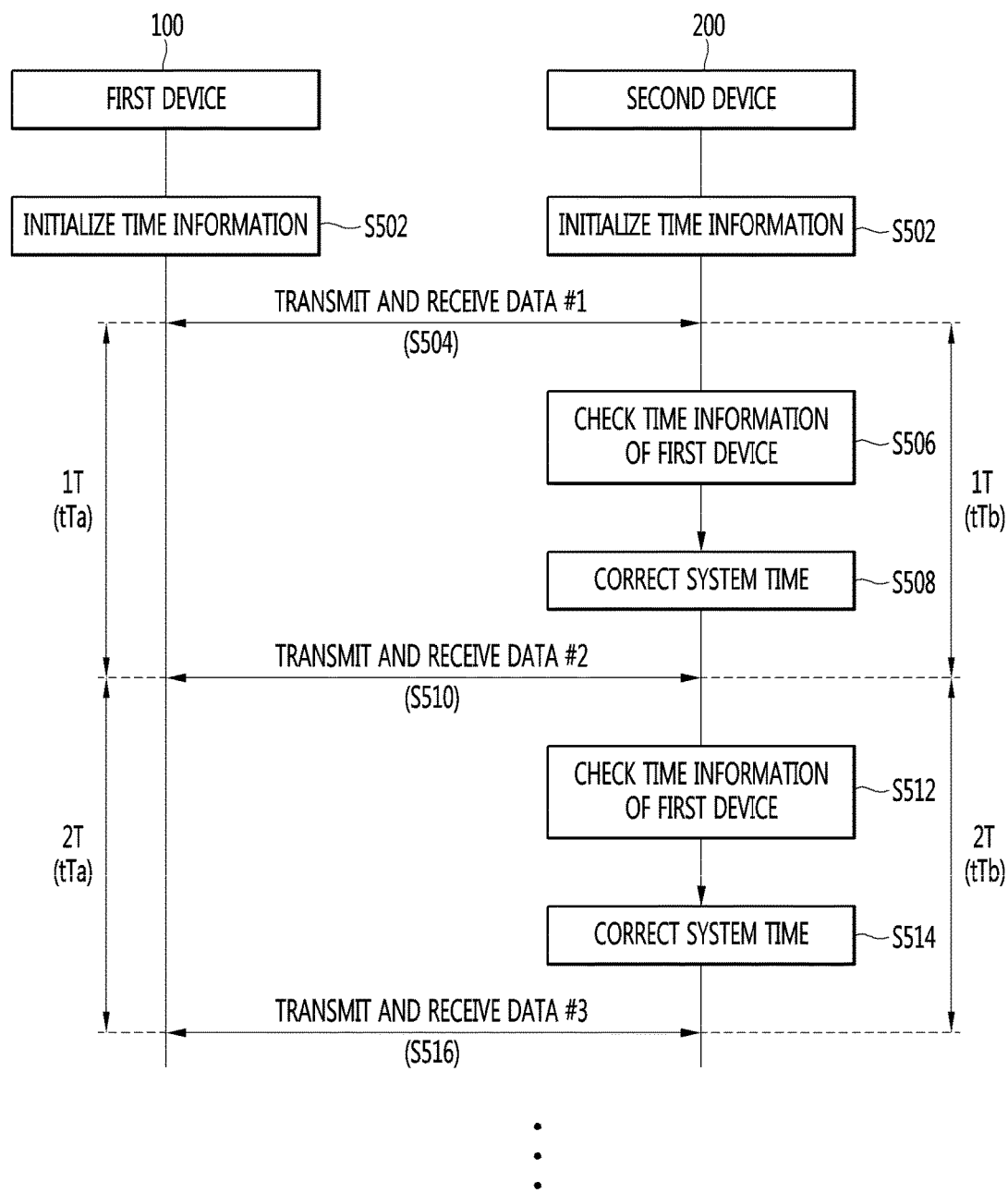

METHOD FOR TIME SYNCHRONIZATION

CROSS-REFERENCE TO RELATED APPLICATIONS

Pursuant to 35 U.S.C. § 119(a), this application claims the benefit of earlier filing date and right of priority to Korean Patent Application No. 10-2015-0052757, filed on Apr. 14, 2015, the contents of which are all hereby incorporated by reference herein in its entirety.

BACKGROUND

The embodiment relates to a method for time synchronization and, more particularly, to a method for time synchronization between devices.

For transmission and receipt of data between devices, an attempt to synchronize the devices is made. At this point, based on time information transmitted from a master device or a specific device out of the devices, a device associated with the master device or the specific device generally follows the master device or the specific device in time.

That is, among devices connected over a communication network, a master device transmits a message including a time stamp. The time stamp may include a point in time when the message is transmitted or time information of the master device. Slave devices connected to the master device may synchronize with the master device based on the time stamp included in the message received from the master device.

FIG. 1 is a block diagram illustrating an existing operation for time synchronization between devices.

Referring to FIG. 1, a communication system including an existing server 10 and a client 20 may perform time synchronization in a software handshaking scheme. In the software handshaking scheme, if the client 20 transmits a time request packet to the server 10 (S11), the server 10 may transmit current time information T of the server 10 as a response packet to the client 20 in response to the time request packet (S12).

Using the following Equation 1, the client 20 may set a current time based on the current time information received from the server 10.

Current Time of Client=$T+RTT/2$     [Equation 1]

That is, in a case where the client 20 transmits a time request packet to the server 10 and receives a response signal including current time information T of the server 10, the client 20 may set a current time by subtracting packet transmission time from the entire time elapsed until receipt of the response signal after transmission of the time request packet and then adding a result of the subtraction RTT/2 to the current information T.

The above-described time synchronization between devices in the software handshaking scheme requires transmission, receipt, and interpretation of communications packets between the devices, so that a few ms time error may occur according to data transceiver, receiver, and system. Although accuracy of time synchronization is able to be achieved using this scheme, additional load may occur in the devices since the communications packets need to be interpreted first. Therefore, there may be a limitation to system management and accordingly lead to a waste of time.

SUMMARY

Embodiments provide a method for time synchronization for a purpose of efficient time synchronization between devices, and the devices using the same. The present disclosure provides a method for time synchronization able to minimize loads required for operations between devices and achieve accurate time synchronization, and the devices using the same.

Embodiments provide a method for time synchronization including: receiving data from a first device; checking time information of the first device, which is included in the received data; and correcting a time error based on the checked time information, wherein the time error is corrected using a correction constant a time error relative to the first device.

BRIEF DESCRIPTION OF THE DRAWINGS

FIG. 5 is a flowchart illustrating an operation for time synchronization between devices according to an embodiment of the present disclosure.

DETAILED DESCRIPTION OF THE EMBODIMENTS

Figure 1:
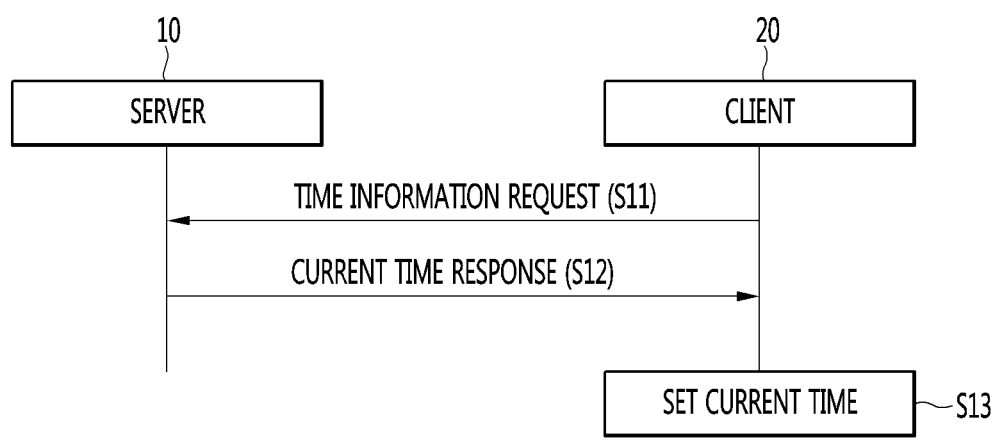
FIG. 1 is a block diagram illustrating an existing operation for time synchronization.

Terms used in the present invention are terms that are currently and widely used, if possible but in a specific case, there may be arbitrarily selected terms and in this case, since their meanings are explained in detail in the detailed description part, the present invention should be understood with the meaning of a term instead of the naming of the term.

This disclosure may, however, be embodied in many alternate forms and should not be construed as limited to the embodiments set forth herein. Accordingly, while the present disclosure is susceptible to various modifications and alternative forms, specific embodiments thereof are shown by way of example in the drawings and will herein be described in detail. It should be understood, however, that there is no intent to limit the present disclosure disclosure to the particular forms disclosed, but on the contrary, the present disclosure is to cover all modifications, equivalents, and alternatives falling within the spirit and scope of the present disclosure as defined by the claims.

Figure 2:
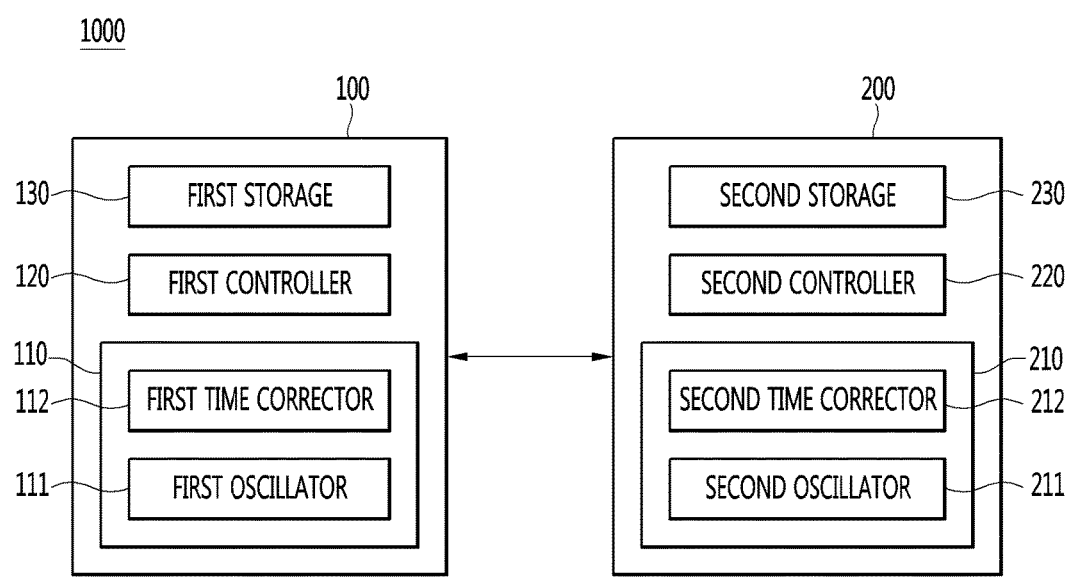
FIG. 2 is a block diagram illustrating an operation for time synchronization according to an embodiment of the present disclosure.

FIG. 2 is a block diagram for explanation of an operation for time synchronization according to an embodiment of the present disclosure.

Referring to FIG. 2, a data transceiver system 1000 may include a first device 100 and at least one second device 200. In the data transceiver system 1000 according to an embodiment of the present disclosure, the first device 100 is a master device, and the second device 200 is a slave device, but aspects of the present disclosure are not limited thereto. That is, the first and second device may be the same devices, or the master device may be set flexibly according to a configuration of the system. Thus, the configuration of the system is not limited. In addition, a plurality of second device may be provided, but aspects of the present disclosure are not limited thereto.

A master device 100 may include a first communicator 110, a first controller 120, and a first storage 130.

The first communicator 110 may include a first oscillator 111 and a first time corrector 112.

The first oscillator 111 may generate a clock signal, and implement device operations based on the generated clock signal. The first oscillator 111 may not be included in the first communicator 110, but may be an external unit.

The first time corrector 112 may set a device time at a specific interval in accordance with the clock signal generated by the first oscillator 111.

The first controller 120 may control the first communicator 110 to write data to be transmitted into a transmission buffer, and to receive data desired to be received into a receiver buffer. In addition, the first controller 120 may control data to be transmitted and received in accordance with a clock signal of the first communicator. In addition, the first controller 120 may check data received from a slave device 200, and transmit the received data added with time information of the master device 100.

The first storage 130 may store data which are able to be transmitted and received between devices. In addition, the first storage 130 may store identification information and state information of devices connected over a network. In a case where the first storage 130 operates as a slave device according to device characteristics, the first storage 130 may store time information received from the master device, and time correction information according thereto.

The slave device 200 may have a configuration similar to that of the master device 100. The slave device 200 may include a second communicator 210, a second controller 220, and a second storage 230.

The second communicator 210 of the slave device 200 may include a second oscillator 211 and a second time corrector 212.

The second oscillator 211 included in the second communicator 210 of the slave device 200 may have a configuration similar to the first oscillator 211 of the master device 100. The second oscillator 211 may generate a clock signal at a specific interval, and perform operations of the slave device 200 in accordance with the generated clock signal.

Based on time information received from the master device 100, the second time corrector 212 may correct a time error to cause time of the slave device 200 to converge to time of the master device 100. Specifically, the second time corrector 212 may receive time information of the master device 100, and synchronize time of the slave device 200 with time of the master device 100 based on the received time information of the master device 100, time information of the slave device 200, and a time correction constant. Operations of the second time corrector 212 and time correction operations according to an embodiment will be described in detail with reference to FIG. 6.

The controller 220 may control the second time corrector 212 to correct and compensate for a time error based on the time information received from the master device 100. Based on a corrected time, the second controller 220 may control data to be transmitted and received.

The second storage 230 may store data which are able to be transmitted and received between the master device 100 and devices connected over a network. The second storage 230 may store time information received from the master device 100 or from the devices connected over a network, and store time correction information data to be corrected by the second time corrector 212 and corrected time information. The time correction information data stored in the second storage 230 may include a correction constant based on the time information received from the master device 100, and the number of times the time correction has been performed. The second storage 230 may store the corrected time information and a correction constant according thereto.

Based on the above-described device configurations according to an embodiment of the present disclosure, a data transmitting and receiving operation according to an embodiment of the present disclosure is described with reference to FIGS. 3 to 5.

Figure 3:
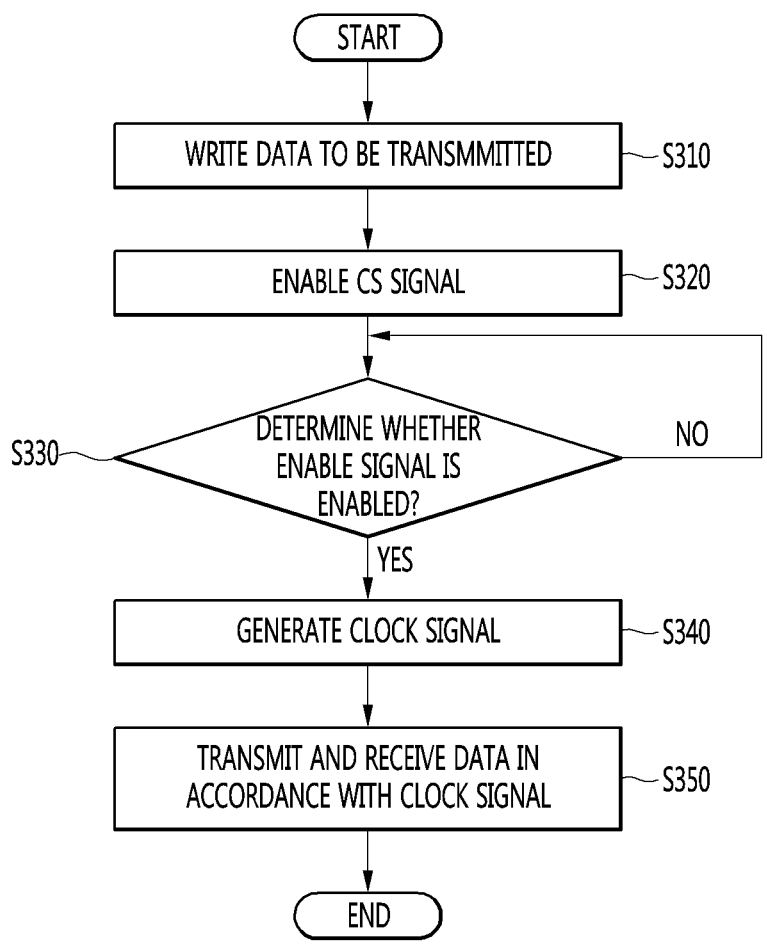
FIG. 3 is a flowchart illustrating how a first device transmits and receives data according to an embodiment of the present disclosure.
Figure 4:
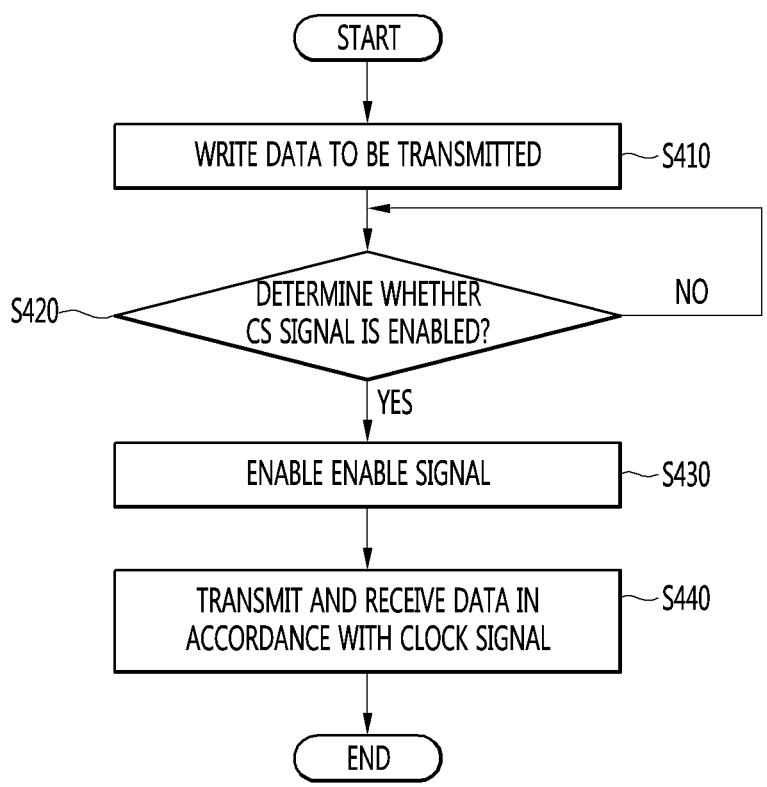
FIG. 4 is a flowchart illustrating how a second device transmits and receives data according to an embodiment of the present disclosure.

FIG. 3 is a flowchart illustrating how a first device transmits and receives data according to an embodiment of the present disclosure, and FIG. 4 is a flowchart illustrating how a second device transmits and receives data according to an embodiment of the present disclosure. FIGS. 3 and 4 are described in conjunction with FIG. 2.

Referring to FIG. 3, the first controller 120 of a first device 100 that is the master device according to an embodiment of the present disclosure may write, into a transmission buffer, data to be transmitted to the slave device 200 (S310).

After the data are completely written into the transmission buffer, the first controller 120 may enable a Chip Select (CS) signal (S320).

The first controller 120 may determine whether an enable signal of the slave device 200 is enabled (S330).

In response to a determination that the enable signal is enabled to allow data to be received from the slave device 200, the first controller 120 controls the first oscillator 111 to generate a clock signal (S340).

Based on the generated clock signal, the first controller 120 may transmit the data written into the transmission buffer to the slave device 200.

How the slave device 200 transmits and receives data according to operations of the master device 100 is described with reference to FIG. 4.

Referring to FIG. 4, based on the control of the second controller 220, the slave device 200 may write, into a transmission buffer, data to be transmitted to the master device 100 (S410).

After the data is completely written into the transmission buffer, the second controller 230 may determine whether a CS signal of the master device 100 is enabled (S420).

In response to a determination that the CS signal of the master device 100 is enabled, the second controller 230 may enable an enable signal (S430). That is, in order to transmit data written into the transmission buffer to the master device 100, the second controller 230 of the slave device 200 enables an enable signal once the CS signal of the master device 100 is enabled.

Once the enable signal is enabled, the second controller 230 may control the second oscillator 211 to generate a clock signal. Based on the clock signal generated by the second oscillator 211, the second controller 230 may transmit or receive data.

At this point, according to an embodiment of the present disclosure, the second device, that is, the slave device, may check time information of the master device, which is included in data received from the master device, and may correct time of the slave device based on the checked time information.

Hereinafter, a method for time synchronization between devices according to an embodiment of the present disclosure is described in detail with reference to FIG. 5.

FIG. 5 is a flowchart illustrating an operation for time synchronization between devices according to an embodiment of the present disclosure. FIG. 5 is described in conjunction with FIG. 2.

Referring to FIG. 5, a first device 100 and a second device 200 according to an embodiment of the present disclosure may perform synchronization based on time information included in the above-described data transmitted and received between the devices.

Each of the first device 100 and the second device 200, that is, the master device 100 and at least one slave device 200, may initialize time information thereof to perform time synchronization with each other (S502).

Once the time information of the master device 100 and the slave device 200 are initialized, the devices 100 and 200 may transmit and received data relative to each other, as described in FIGS. 3 and 4, (S504).

At this point, the slave device 200 may check time information of the master device 100, which is included in data received from the master device 100 (S506).

Based on time information received at a point in time when data is completely transmitted and received relative to the master device 100, the slave device 200 may correct time information thereof (S508). That is, based on time information included in the last data which received from the master device 100, the slave device 200 may correct time information thereof.

The time information of the slave device 200 may be corrected using Equation 2 as below:

Second device_Time[1]=Second device_Time[1]−α
X(Second device−First device), (0<α<1)  [Equation 2]

As shown in Equation 2, time of the slave device 200 which is corrected based on time information of the master device 100 at a point in time when data is completely transmitted and received may be a difference between a time of the slave device 200 and a value that is obtained by subtracting of time of the master device 100 from the time of the slave device 200 and then multiplying a result of the subtraction by a correction constant α. At this point, the correction constant α may be a value between 0 and 1.

The slave device 200 whose time is corrected using Equation 2 may synchronize with the master device 100 in terms of time, and then time may be counted based on the corrected time until the next data is transmitted and received. In FIG. 5, there is provided an example in which the second data is transmitted and received after a predetermined time Ta, Tb (or an interval 1T) since the first data is completely transmitted and received.

The master device 100 and the slave device 200 may perform an operation of transmitting and receiving data after the predetermined time Ta, TB (that is, the interval 1T).

After the second data is completely transmitted and received, the slave device 200 may re-perform time correction which is performed when the first data is completely transmitted and received.

That is, after the second data is completely transmitted and received, the slave device 200 may check time information included in the last data received from the master device 100, which is, in other words, time information received at a point in time when the data is completely transmitted and received relative to the master device 100 (S512).

Based on the checked time information, the slave device 200 may correct time information thereof (S514).

After the second data is completely transmitted and received, the slave device 200 correct time information thereof according to the above Equation 2.

At this point, time received from the master device 100 may be time which is a result of adding time Ta, which has lapsed after transmission of the second data, to the time information transmitted along with the first data.

Accordingly, time of the slave device 200 may be corrected using Equation 2.

Second device_Time[2]=Second device_Time[2]−α
X(Time of Second device−First device)=2Tb−
αX(Tb−Ta) (0<α<1)

That is, at a time when the second data is completely transmitted and received after time Ta, Tb since transmission and receipt of the first data, time of the slave device 200 may be calculated by adding the lapsed time to time which was corrected when the first data was transmitted and received.

Based on the above-described operations, the master device 100 and the slave device 200 may transmit and receive the third data after Ta, Tb (2T) has lapsed.

As described above, the master device 100 and the slave device 200 may transmit and receive data, and the slave device 200 may synchronize with the master device 100 in terms of time by correcting time of the slave device 200 based on time information included in data received from the master device 100. Therefore, in the case where the slave device 200 transmits and receives data respective to the master device 100 and performs time correction n number of times, a corrected time of the second device 200 may be defined as shown in Equation 3 as below:

$$\frac{T_b(1-(1-\alpha)^n)}{\alpha} + nT_a - \frac{T_2(1-(1-\alpha)^n)}{\alpha}. \qquad \text{[Equation 3]}$$

Using Equation 3, the master device 100 and the slave device 200, that is, the first device and the second device, transmit and receive data. A time error between the first and second devices may converge to $$\frac{T_b - T_a}{\alpha}$$

in proportion to increase in the number of times the second device 200 has corrected time based on time information of the first device 100. That is, the time error between the first and second devices may converge to a value that is a result of dividing, by a correction constant α, a difference in intervals between the first and second devices for transmitting and receiving data (Tb−Ta).

In addition, the correction constant α may be set to be a value between 0 and 1. The closer the correction constant α to 1, the greater the corrected value may be obtained. Thus, in a case where a temporary error occurs, a value for correction of the error may be great. In addition, if the correction constant α is close to 0, the time error may converge to 0. Therefore, in a case where a time error between the first and second devices is equal to or greater than a reference value, time correction may be performed using a correction constant α which is set to be a value close to 1. Alternatively, in a case where a time error between the first and second devices is smaller than the reference value, time correction may be performed using a constant value α which is set to be a value close to 0.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for time synchronization, comprising:
   receiving data from a first device;
   checking time information of the first device, which is included in the received data;
   correcting a time error based on the checked time information;
   storing a corrected time information and a correction constant based on the corrected time error; and
   synchronizing a current time with a time of the first device based on the stored corrected time information and the correction constant,
   wherein the time error is corrected using a correction constant according to a time error relative to the first device, and
   wherein the time error is corrected using a following equation:

Second device−Time[1]=Second device_Time[1]−α
   X(Second device_Time−First device_Time),
   (0<α<1)

where a time error relative to the first device is multiplied by a correction constant (α), which is determined depending on the time error relative to the first device, and then a resultant value of the multiplication is subtracted from a current time value.

2. The method of claim 1, further comprising:
   enabling an enable signal when a Chip Select (CS) signal is enabled by the first device; and
   transmitting another data to the first device according to a clock signal when the enable signal is enabled.

3. The method of claim 1, further comprising: initializing preset time information before correcting the time error.

4. The method of claim 1, wherein the time error is corrected based on time information included in data previously received from the first device.

5. The method of claim 1, wherein, if a second data transmission is received after a threshold time (Ta, Tb) has lapsed after the time error is corrected, the time error is further corrected by adding the lapsed threshold time (Ta, Tb) to the corrected time (Second device−Time[1]).

6. The method of claim 1, wherein, if the time error relative to the first device is greater than a reference value, the time error is corrected using a correction constant (α), which is set to be a value close to 1.

7. The method of claim 1, wherein, if a data transceiving operation is performed n number of times relative to the first device, a result of correcting the time error is determined based on a correction constant a and a number of correction times n and represented as in $$\frac{T_b(1-(1-\alpha)^n)}{\alpha} + nT_a - \frac{T_2(1-(1-\alpha)^n)}{\alpha}.$$

8. The method of claim 7, wherein the time error relative to the first device converges to $$\frac{T_b - T_a}{\alpha}$$

in proportion to increase in the number of correction times n that time has been corrected based on the time information of the first device.

* * * * *